United States Patent [19]

Regnaudin et al.

[11] Patent Number: 4,855,962
[45] Date of Patent: Aug. 8, 1989

[54] METHOD AND SYSTEM FOR LOCATING AND CORRECTING THE ORIENTATION OF AN AUTONOMOUS MOBILE OBJECT AND A NON-AUTONOMOUS MOBILE OBJECT

[75] Inventors: Jacques Regnaudin, Paris; Francois Boucquaert, Catus, both of France

[73] Assignee: Compagnie Generale De Geophysique, Massy Cedex, France

[21] Appl. No.: 68,540

[22] Filed: Jun. 29, 1987

[30] Foreign Application Priority Data

Jul. 1, 1986 [FR] France .............................. 86 09529

[51] Int. Cl.⁴ ........................... G01V 1/38; G01S 5/12
[52] U.S. Cl. ..................................... 367/19; 342/394; 342/463
[58] Field of Search ............... 342/216, 386, 394, 453, 342/463; 367/6, 19

[56] References Cited

U.S. PATENT DOCUMENTS

| H388 | 12/1987 | Lloyd ..................................... 367/19 |
| 3,421,138 | 1/1969 | Moulin et al. ......................... 367/128 |
| 3,787,944 | 1/1974 | Hastings et al. ................. 392/394 X |
| 4,110,726 | 8/1978 | Dorrance et al. .................... 367/128 |
| 4,532,617 | 7/1985 | Baecker et al. . | |

FOREIGN PATENT DOCUMENTS

2089043 6/1982 United Kingdom .................... 367/6

Primary Examiner—Thomas H. Tarcza
Assistant Examiner—Gilberto Barrón, Jr.

[57] ABSTRACT

In a method of locating and orienting a first direction linked to the position and to the orientation of an autonomous first mobile object (M), such as a ship towing a marine geophysical prospecting cable, and a second direction formed by a non-autonomous second mobile object (Bj), such as a buoy at the trailing end of the towed cable, and at least one reference point on the first mobile object relative to a fixed reference radionavigation system comprising at least two reference beacons (Si, Si+1) the first mobile object (M) and the second mobile object (Bj) are respectively provided with a first communication device (MI) providing communications between the first mobile object (M) and the reference beacons (Si, Si+1) and a second communication device (MJ) providing communications between the first mobile object (M) and the second mobile object (Bj). They are further provided with a communication device (BIJ) providing communications between each reference beacon (Si, Si+1) and the second mobile object (Bj). Firstly, the position of the first mobile object (M) relative to the reference radionavigation system and the orientation of the first direction relative to the first mobile object (M) are determined. Then the position of the second mobile object (Bj) relative to the reference radionavigation system is determined. Finally, the angular offset between the first and second directions is determined, with a view to correcting the orientation of the first direction relative to the second direction.

18 Claims, 3 Drawing Sheets

FIG_1a

FIG_1b

FIG_1c

METHOD AND SYSTEM FOR LOCATING AND CORRECTING THE ORIENTATION OF AN AUTONOMOUS MOBILE OBJECT AND A NON-AUTONOMOUS MOBILE OBJECT

BACKGROUND OF THE INVENTION

1. Field of the Invention

The present invention relates to a method utilizing a radionavigation system in a routine way to locate a reference point on a first mobile object and making it possible, without modifying the radionavigation system, to:

locate on board the first object a plurality of second mobiel objects linked to the first object or not, in real time;

orient the direction defined by each of these second objects and the reference point on the first object on board the latter in real time;

orient a reference direction linked to the structure of the first mobile object in the case where acoustical, optical or radio-electrical systems linked to the first object make it possible to define the orientation of the second mobiles relative to the reference direction of the first mobile; thisis also valid if the aforementioned acoustical, optical or radio-electrical systems make it possible to locate the second objects in a reference system linked to the structure of the first mobile. This operation is effected on board the first mobile and in real time.

2. Description of the prior art

Radionavigation systems as used nowadays for locating mobile objects such as ships or the like usually employ a radionavigation system providing for a circular or hyperbolic type location method. The principle of locating one or more autonomous mobile objects relative to one or other of the location systems does not raise any major problem, modification of the relative position of one or other of the autonomous mobiles, or even of their orientation relative to a reference direction, involving only an exchange of their respective position as determined relative to a common reference radionavigation system under the normal conditions for utilization of the latter.

If it is necessary to define the orientation of the direction formed by a non-autonomous second object and at least one reference point on the autonomous first object, the non-autonomous second object not being itself able to calculate and communicate its position to the first mobile object, which is autonomous, the solutions proposed until now usually entail defining the angular offset between this direction and a reference direction linked to the first mobile by acoustical, optical or radio-electrical methods using the first mobile as a reference.

Although the angular offset can be defined with satisfactory precision, the same cannot be said of the absolute orientation, which depend on the accuracy with which the reference direction is known. In the case of ships, this is defined by a gyrocompass which can introduce errors of as much as one degree due to changes in the position of the ship, especially in the case of three-dimensional seismic investigations.

It is, of course, out of the question to render the second mobile object autonomous, that is to say capable of establishing its own position and communicating it to any other mobile, because of the prohibitive cost and the fact that it is virtually impossible to do so for material or technical reasons, where the second mobile object is of low buoyancy and cannot carry bulky and heavy equipment. This difficulty is accentuated in the presence of a plurality of non-autonomous second mobile objects, as in the case of marine geophysical prospecting using a plurality of towed cables (known as "multistreamer" prospecting).

In the case where a circular location type radionavigation system with active mobiles is used, the number of mobiles that can be accepted is limited and the system must be configured to accep these mobiles, imposing very severe limitations since this is not always possible.

An object of the invention is to remedy the aforementioned disadvantages by providing a method and a system for locating and orienting a first direction linked to the position and orientation of an autonomous first mobile object and a second direction defined by a non-autonomous second mobile object and at least one reference point on the first mobile object and involving little expenditure on navigation equipment.

Another object of the present invention is to provide a method and a system for locating and orienting a first direction linked to the position and orientation of an autonomous first mobile object and a second direction defined by a non-autonomous second mobile object and at least one reference point on the first mobile object using an acoustical, optical or radio-electrical system defining the position or the orientation of the second mobile in a reference system linked to the first mobile.

A further object of the present invention is to provide a method and a system for locating and orienting a first direction linked to the position and to the orientation of an autonomous first mobile object and a second direction defined by a non-autonomous second mobile object and a reference point on the autonomous first mobile using a radionavigation system, the method and the device of the invention being totally transparent to the radionavigation system and therefore not requiring any modification thereto.

A final object of the present invention is to provide a method and a system for locating and orienting a first direction defined by the axis of an autonomous first mobile object and a non-autonomous second mobile object of great precision.

SUMMARY OF THE INVENTION

The method and system for locating and correcting a first direction linked to the position and to the orientation of a first mobile object and a second direction defined by a second mobile object and at least one reference point on the first mobile object relative to a reference radionavigation system in accordance with the invention are remarkable in that, the fixed reference radionavigation system comprising at least two reference beacons, the first and the second mobile objects are respectively provided, on the one hand, with first communication means providing communications between the first mobile object and the reference beacons and second communication means providing communications between the first and second mobile objects and, on the other hand, communication means providing communications between each reference beacon and the second mobile object, the method and the system making it possible, following determination of the position of the first mobile object relative to the reference radionavigation system and of the orientation of the first direction relative to the first mobile and determination of the position of the second mobile object relative to the reference radionavigation system, to determine the angular offset between the first and second directions with a view to correcting the orientation of the two directions.

The invention can be applied to locating and orienting a master or autonomous mobile object relative to a preferential direction defined by one or more non-autonomous objects which may or may not be constrained to move with the autonomous mobile object, and in particular to locating and/or correcting the relative orientation of a towing ship and towed marine geophysical prospecting cables of a mono- or multi-streamer system.

The invention will be better understood from a reading of the following description with reference to the accompanying drawings.

DESCRIPTION OF THE PREFERRED EMBODIMENTS

The method in accordance with the invention will first be described in relation to FIG. 1a.

Figure 1A:
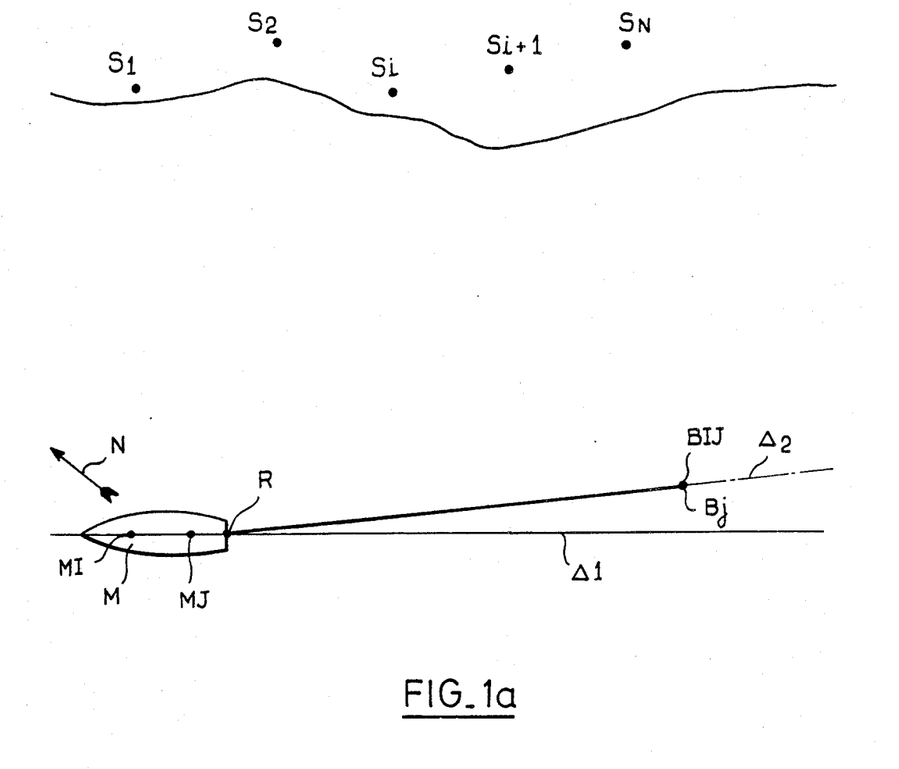
FIG. 1a is a schematic representation of the various steps of the method in accordance with the invention, specifically in the case where the latter is used to locate and/or orient a marine geophysical prospecting cable.

In the aforementioned FIG. 1a a first direction denoted $\Delta 1$ is linked to the position and the orientation of an autonomous first mobile object denoted M. A second direction is defined by a non-autonomous second mobile object denoted Bj and at least one reference point R on the first mobile object M. In a non-limiting but advantageous way the first mobile object M may be a ship towing a marine geophysical prospecting cable, for example, the prospecting cable extending aft of the ship in a particular direction. The direction corresponding to the deployment of the cable may be represented by the aforementioned direction $\Delta 1$ or first direction. This direction may be determined in the conventional way relative to magnetic north denoted N by means of compasses disposed regularly along the prospecting cable. The direction $\Delta 1$ thus corresponds to the measured direction of the prospecting cable and not to its real direction, given the measuring errors inherent to the compasses used to determine the direction in which the cable is deployed. Specifically, for prospecting cables which can be up to three kilometers long the error in the measured orientation, corresponding to the direction $\Delta 1$ relative to the true direction of the cable corresponding to its true position, for example the direction $\Delta 2$, can easily be as much as one degree.

According to the location and orientation method in accordance with the invention the location and correction of the orientation of the aforementioned first direction $\Delta 1$ and the second direction $\Delta 2$, corresponding to the true direction in which the prospecting cable is deployed, is effected relative to a fixed reference radionavigation system comprising at least two reference beacons denoted Si, Si+1. FIG. 1a shows a plurality of reference beacons respectively denoted S1, S2, Si, Si+1, SN.

In the method in accordance with the invention the first mobile object M and the second mobile object Bj are respectively provided, on the one hand, with first communication means MI providing communications between the first mobile object M and the reference beacons Si, Si+1 and second communication means Mj providing communication between the first mobile object M and the second mobile object Bj. On the other hand, the second mobile object Bj is provided with communication means BIJ providing communications between each reference beacon Si, Si+1 and the second mobile object Bj.

An advantageous characteristic of the method in accordance with the invention is that it entails determining the position of the first mobile object M relative to the reference radionavigation system consisting of the reference beacons Si, Si+1 and the orientation of the first direction relative to the first mobile object M. As previously described, the orientation of the first direction $\Delta 1$ relative to the first mobile object M may be determined by means of compasses disposed regularly along all of the length of the prospecting cables.

The position of the second mobile object Bj, this second mobile object consisting, for example, of the end of the prospecting cable, is then determined relative to the reference radionavigation system. The angular offset between the first and second directions $\Delta 1$, $\Delta 2$ is then determined in order to correct the orientation of the first direction $\Delta 1$ relative to the second direction $\Delta 2$.

The method in accordance with the invention, as previously defined, therefore makes it possible by virtue of precise location of the end of the geophysical prospecting cable constituting the second mobile object Bj to achieve a very high level of accuracy in the actual location of the prospecting cable relative to its measured position, relative to a standardized reference direction such as magnetic north, denoted N in FIG. 1a.

It will be understood, of course, that in the method in accordance with the invention the first mobile object M is a ship towing a prospecting cable and the second mobile object denoted Bj is the buoy at the trailing end of the marine geophysical prospecting cable towed by that ship.

Figure 1B:
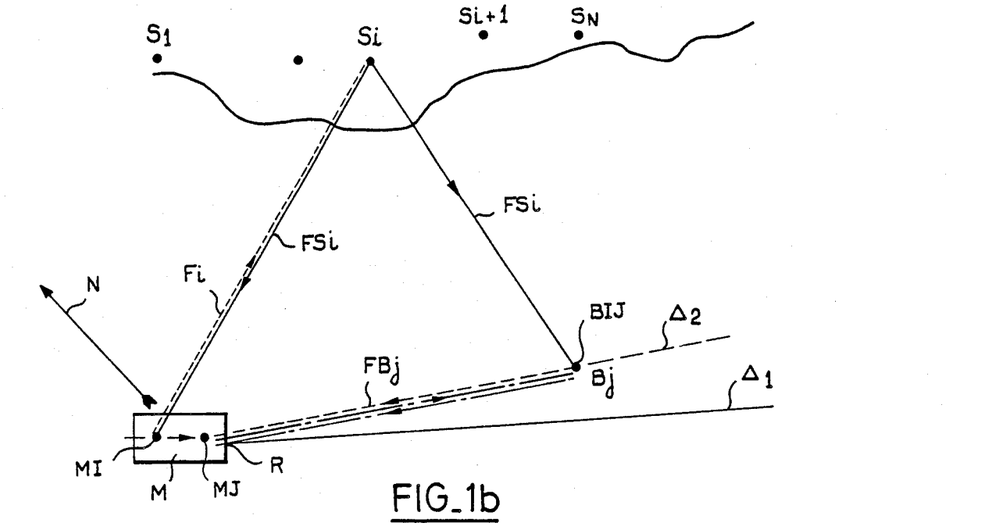
FIG. 1b is a schematic representation of a location protocol for implementing the method in accordance with the invention as shown in FIGS. 1a in the case where the radionavigation system is a circular type location radionavigation system.

The method in accordance with the invention will first be described in an advantageous, non-limiting embodiment in the case where the reference radionavigation system is a circular type location radionavigation system. In this case, the stages of the method in accordance with the invention consisting in determining the position of the first mobile object M relative to the radionavigation system and then determining the position of the second mobile object Bj relative to the same reference radionavigation system consist in executing a location protocol as follows.

In the aforementioned case, the location protocol may consist in using the first communication means MI to interrogate each of the reference beacons denoted Si, Si+1 or a plurality of these to establish, on the basis of the round trip propagation time between the mobile M and each of the reference beacons Si, Si+1 interrogated, the successive distances $\overline{MSi}$ between the first mobile M and each of the reference beacons Si, S1+1. The position of the first mobile M is then determined from the positions of the reference beacons denoted Si, Si+1. In FIG. 1b, Fi denotes the frequency of the signal by which the communication means MI interrogates each of the beacons Si. The frequency at which each beacon Si transmits is denoted FSi.

Simultaneously with reception of the signals is frequency FSi transmitted by the corresponding beacon Si the same signal is received by the communication means DIJ of the second mobile object Bj, the signal of frequency FSi, FSi+1 being transmitted in response to its interrogation by the reference beacon in question. The signal received by the previously mentioned communication means BIJ is also retransmitted to the first mobile M, by means of the second communicaton means MJ of the mobile M, for example, in order to determine, from the time denoted Ti at which each of the reference beacons Si is interrogated, the closed path denoted M, Si, Bj, M. This path is formed by the elementary distances $\overline{MSi}$, $\overline{SiBj}$, $\overline{BjM}$ between the first mobile object M, the reference beacon Si is question and the second mobile object Bj, respectively.

According to the location protocol shown in FIG. 1b, interrogation of the second mobile object Bj by the second communication means MJ makes it possible to determine the distance between the point R on the first mobile object M and the second mobile object Bj and at least two reference beacons denoted Si, Si+1, these distance being denoted $\overline{SiBj}$, $\overline{Si+1Bj}$, is determined by calculating the difference between the corresponding closed path distances, denoted $\overline{MSiBjM}$, $\overline{MsI+1BjM}$, and the distance denoted $\overline{MBj}$.

Circular type lcoation of the position of the second mobile object Bj relative to the reference radionavigation system may then be based on the distances denoted $\overline{SiBj}$, $\overline{Si+1Bj}$ between the second mobile object Bj and the reference beacons ranked i, i+1.

In accordance with an advantage characteristic of the method in accordance with the invention, retransmission to the first mobile M of the signal at frequency FSi received by the communications means BIJ by means of the second communication means MJ and/or interrogation of the second mobile object Bj by means of the second communication means MJ may be effected at a low power setting and at a carrier frequency different from the frequency FSi, FSi+1 at which the reference beacons Si, Si+1 transmit.

Figure 1C:
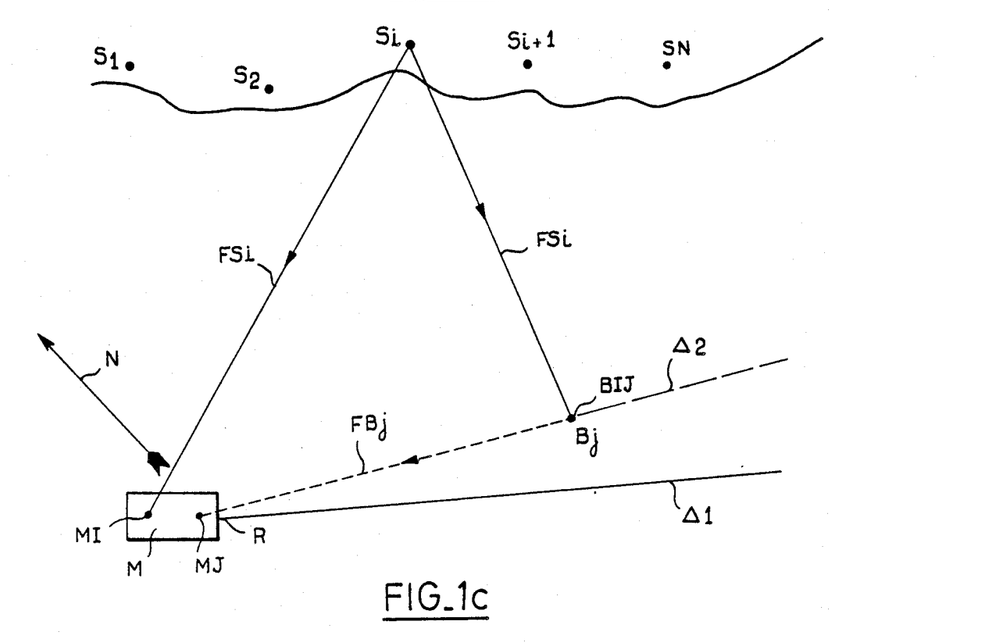
FIG. 1c is a schematic representation of a location protocol for implementing the method in accordance with the invention as shown in FIG. 1a in the case where the radionavigation system is a hyperbolic type location radionavigation system.

The method in accordance with the invention will also be described in an advantageous, non-limiting embodiment in the case where the reference radionavigation system is a hyperbolic type location radionavigation system, as shown in FIG. 1c.

In this figure, the same reference numbers represent substantially the same elements as in FIG. 1b with, of course, adaptations necessary for operation with a hyperbolic type location radionavigation system. As shown in the aforementioned FIG. 1c, the location protocol may consist in receiving by means of the first communication means MI the sequence transmitted by each of the reference beacons Si, Si+1. In hyperbolic type location radionavigation systems, the reference beacons transmit sequentially a frequency denoted FSi, the difference in propagation time between a specific fixed point and two successive transmissions from two reference beacons, Si, Si+1 being determinable by a receiver situated at the aforementioned fixed point. The sequence transmitted by each of the reference beacons Si, Si+1 serves to establish the difference denoted $\overline{MSi}-\overline{MSi+1}$ between the distance from the first mobile M to a first reference beacon Si and the distance from the first mobile M to a second reference beacon Si+1, for a plurality N of reference beacons, for example. The position of the point R on the first mobile M may then be determined relative to the positions of the reference beacons Si, Si+1. Simultaneously with reception of the signal at frequency FSi from the reference beacon Si, the location protocol further consists in receiving by means of the communication means BIJ of the second mobile object Bj the sequence transmitted by each reference beacon Si, Si+1. Furthermore, a response signal to transmission of the frequency FSi from each reference beacon Si is retransmitted by means of the communication means BIJ of the first mobile M with a view to determining the composite path distance Si, Bj, M constituted by each elementary distance denoted $\overline{SiBj}$, $\overline{BjM}$ and $\overline{Si+1Bj}$, $\overline{BjM}$ between each reference beacon Si and the second and first mobile objects Bj, M, respectively.

The position of the second mobile object Bj relative to the reference radionavigation system may then be determined by the hyperbolic location method on the basis of the difference denoted $\overline{SiBj}-\overline{Si+1Bj}$ between the second mobile object Bj and the reference beacons Si, Si+1. It will be understood, of course that the location may be effected relative to a specific reference beacon, such as the beacon S1, for example, location relative to the beacon Si of rank i having been described by way of example to avoid compromising the general applicability of the previously described location protocol.

In an advantageous embodiment of the method in accordance with the invention a response signal to the transmission from each reference beacon Si may be retransmitted to the first mobile M by means of the communication means BIJ at a low power level and at a carrier frequency different to the frequencies FSi transmitted by the reference beacons Si generating the transmission sequence. In the conventional way, retransmission is synchronized on the transmission sequence and may be effected between the periods in which each reference beacon Si transmits, for example.

Whether the radionavigation system used is of the circular or hyperbolic location type, the method in accordance with the invention as previously described is not, of course, limited to the location and orientation of a first direction linked to the axis of a first mobile object M and of a second direction. In particular, it may e used with advantage to locate and orient a first direction linked to the orientation of a first mobile object M and a preferred direction from a plurality of second directions formed by a plurality of second mobile objects Bj and at least one reference point of the first mobile object M. In this case, each second mobile object Bj is provided with communication means BIJ providing communication between each reference beacon Si, Si+1 and each second mobile object Bj. The first mobile object M is provided with second communication means MJ providing communication between the first mobile object M and each of the second mobile objects Bj. The aforementioned preferred direction may advantageously be the mean direction of all the second mobile objects Bj relative to the reference point on the first mobile object. A location and orientation system enabling the method in accordance with the invention to be implemented will now be described with reference to FIGS. 2a and 2b.

Figure 2A:
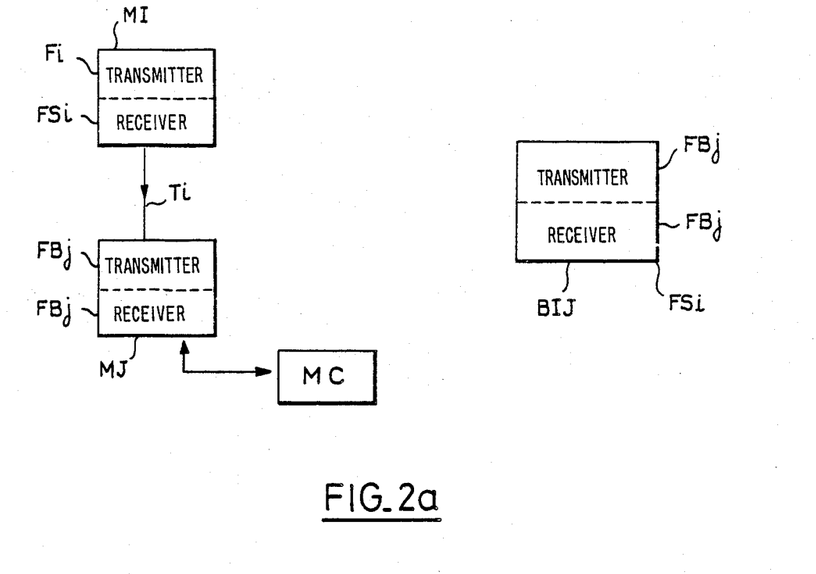
FIG. 2a is a block diagram of an advantageous system for implementing the method in accordance with the invention as defined in relation to FIGS. 1a and 1b.

Generally speaking, the system for locating and orienting a first direction linked to the position and to the orientation of an autonomous first mobile object M and a second direction formed by an non-autonomous second mobile object Bj and at least one reference point on the first mobile object M relative to a fixed radionavigation system comprising at least two reference beacons Si, Si+1 is arranged, where the radionavigation system is a circular type location radionavigation system, so that the first mobile object M comprises first communication means MI for interrogating each of the reference beacons Si, Si+1 or a plurality of these. The first mobile object M further comprises second communication means denoted MJ for interrogating the second mobile object Bj to determine the distance from the first mobile object m to the second mobile object Bj. FIG. 2a shows the first communication means MI and the second communication means MJ, the aforementioned communication means respectively transmitting at the frequency Fi, which is the frequency of the signal interrogating each beacon Si, and receiving at the frequency FSi, which is the frequency of the signal transmitted by each of the reference beacons Si. The communication means MJ transmits and receives at frequencies different to the frequency FSi at which the reference beacons Si transmit. The transmit and receive frequencies of the communication means MJ may advantageously be the same and represented FBj. In FIG. 2a, the location and orientation system advantageously comprises at the second mobile object Bj communication means BIJ providing communication between each reference beacon Si, Si+1 and the second mobile object Bj. The communication means BIJ enables reception of the signal at frequency FSi from each reference beacon Si, Si+1 and retransmission at a determined frequency to the second communication means MJ of the first mobile M of a response signal to the signal at frequency FSi received by the communication means BIJ. The communication means BIJ thus transmits at the frequency FBj to retransmit the response signal to the signal FSi and receives the frequency FSi from each beacon Si and the frequency FBj from the second communication means MJ of the first mobile M. The system comprises at the first mobile M calculation means denoted MC for calculating the distances $\overline{MSi}$, $\overline{SiBj}$ separating the first mobile object M and the second mobile object Bj from each beacon Si, Si+1 and means for calculating the position of the first and second mobile objects relative to the reference radionavigation system, as well as the orientation of the second direction, for example. The first and second communication means MI, MJ of the first mobile M are, of course, synchronized so that the second communication means MJ is able to receive an interrogation time reference denoted Ti from each of the reference beacons Si. All the drawings show the first and second communication means MI, MJ as physically separated to faciliatate an understanding of this description; the aforementioned means may be physically coincident, of course. The distance, position and orientation calculation means may, of course, consist of the navigation equipment of the mobile M and an associated computer. It will also be noted that the second communication means MJ of the first mobile M serving to interrogate the second mobile Bj and the communication means BIJ serving to retransmit to the first mobile M the response signal to the interrogation frequency FSi may advantageously operate on the same frequency denoted FBj. The second communication means MJ and the aforementioned communication means BIJ may then be operated at low power and at a carrier frequency FBj different to the frequency FSi at which each reference beacon Si, Si+1 transmits.

Figure 2B:
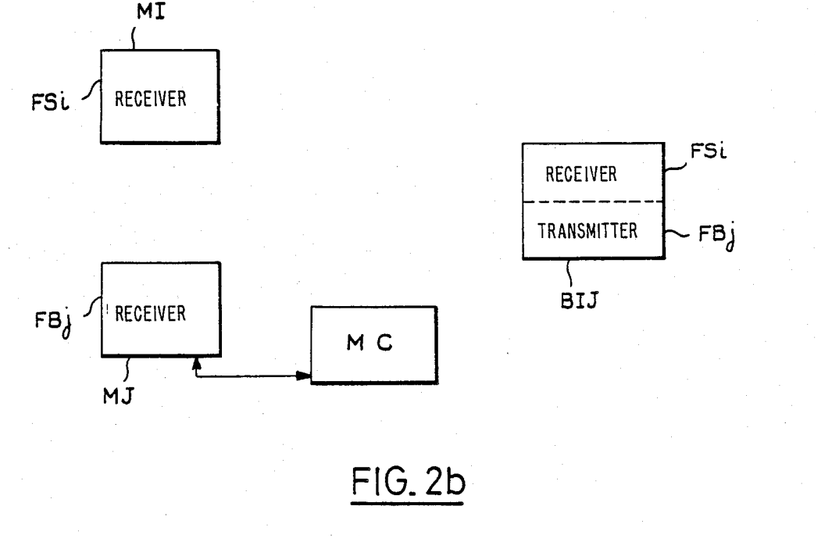
FIG. 2b is a block diagram of an advantageous system for implementing the method in accordance with the invention as defined in relation to FIGS. 1a and 1c.

Another advantageous embodiment of a system for locating and orienting a first direction linked to the position and to the orientation of an autonomous first mobile object M and a second direction defined by a non-autonomous second mobile object Bj and at least one reference point on the autonomous first mobile object M relative to a fixed reference radionavigation system will now be described in the situation where the radionavigation system is a hyperbolic type location system, as shown in FIG. 2b.

In this case, the first mobile object may comprise first communication means denoted MI enabling reception of signals at frequencies FSi, FSi+1 from each of the reference beacons Si, Si+1, according to a predetermined transmission sequence. In FIG. 2b the first communication means MI is receiving the frequency FSi from each of the beacons Si. The second mobile object Bj comprises communication means BIJ enabling successive reception of signals at frequencies FSi, FSi+1 transmitted by each of the reference beacons Si, Si+1 and retransmission of a signal at frequency FBj in response to transmission of the signals at frequencies FSi, FSi+1. In FIG. 2b the communication means BIJ is shown receiving at frequency FSi and transmitting at the retransmission frequency FBj.

The first mobile object M further comprises second communication means MJ enabling reception of the response signal at frequency FBj transmitted by the communication means BIJ in response to transmission of the signals at frequencies FSi, FSi+1 by the reference beacons Si, Si+1.

The location and orientation system in accordance with the invention as shown in FIG. 2b naturally further comprises at the first mobile M calculation means denoted MC for calculating the difference denoted $\overline{MSi} - \overline{MSi+1}$ between the distance from the first mobile M to a first reference beacon Si and the distance from the first mobile M to a second reference beacon Si+1. The aforementioned calculation means can perform this calculation for a plurality N of reference beacons Si. It also enables calculation of the difference $\overline{SiBj} - \overline{Si+1Bj}$ between the distances between the second mobile object Bj and the reference beacons Si, Si+1. The calculation means MC also enable calculation of the position of the first mobile object M and the second mobile object Bj relative to the reference radionavigation system and the orientation of the second direction relative to the first direction, for example.

As previously described with reference to use of a circular location radionavigation system, when it retransmits to the first mobile M the signal in response to transmission of the transmit sequence from each reference beacon Si, Si+1, the communication means BIJ may advantageously be operated at low power and at a carrier frequency FBj different to the frequencies FSi, FSi+1 at which each beacon Si, Si+1 transmits.

In the embodiments of the systems for implementing the method in accordance with the invention as shown in FIGS. 2a and 2b the communication means BIJ of the second mobile object BJ enabling reception of the signal at frequency FSi transmitted by each reference beacon Si, Si+1 and retransmission to the second communicaton means MJ of the first mobile object M comprises a transponder, for example.

It will be further understood that the first mobile object M, in the case where the system in accordance with the invention is used for marine geophysical prospecting using a towed cable, is a ship towing the prospecting cable and the second mobile object Bj may advantageously by the buoy at the trailing end of the marine geophysical prospecting cable towed by the ship. The system can of course comprise a plurality of second mobile objects, each consisting of the buoy at the trailing end of one of a plurality of marine geophysical prospecting cables towed by the ship.

The previously mentioned calculation means may consist of the on-ship computer.

The location and orientation correction system in accordance with the invention may advantageoulys be implemented using the SYLEDIS system marketed by SERCEL (Societe d'Etudes, Recherches et Constructions Eletroniques). This system is the subject matter of published French patent application No 2 248 517. In particular, the communication means BIJ and MJ may consist of SB5 type transponders or radiobeacons. This type of beacon makes it possible to locate at the same time as a first mobile M such as a ship towing a plurality of geophysical prospecting cables eight second mobile objects Bj when two refrence beacons Si, Si+1 are used or six second mobile objects in the case where three reference beacons are used.

If NS is the number of reference beacons on the shore and NB is the number of objects to be located, the values NB and NS are related as follows:

|    | 2 + NB + NS + NB × | NS ≦ 30 |
|----|--------------------|---------|
| If | NB = 2             | NS ≦ 8  |
|    | NB = 3             | NS ≦ 6  |
|    | NB = 4             | NS ≦ 4  |
|    | NB = 5 through 7   | NS ≦ 3  |
|    | NB = 8             | NS ≦ 2  |

No modification to the reference radionavigation system is required in any of these cases.

The method of locating and orienting a first direction linked to the position and to the orientation of an autonomous first mobile object and a second direction defined by a non-autonomous second mobile object and at least one reference point on the first mobile object relative to a fixed reference radionavigation system comprising at least two reference beacons in accordance with the invention is not, of course, limited to marine seismic type applications in which the autonomous mobile object M is a ship and the non-autonomous mobile object, consisting of the buoy at the end of the prospecting cable, is mechanically attached to the autonomous mobile object M. Thus by non-autonomous mobile object is equally meant any mobile object not constrained to move with the autonomous mobile object; the non-autonomous mobile objects then comprise one or more mobile objects such as ships moving or sailing together with the autonomous mobile object consisting of a master ship. The non-autonomous mobile objects are then provided with transponders forming the communication means BIJ, the non-autonomous character of these mobiles or ships then being conferred on them only by virtue of their dependence on the processing means for calculating the position and orientation of the autonomous mobile or ship M.

We claim:

1. Method of locating or orienting a first direction linked to the position and to the oreintation of an autonomous first mobile object (M) and a second direction defined by a non-autonomous second mobile object (Bj) and at least one reference point on the first mobile object relative to a fixed reference radionavigation system comprising at least two reference beacons (Si, Si+1), the first mobile object (M) and the second mobile object (Bj) being respectively provided, on the one hand, with first communication means (MI) providing communications between the first mobile object (M) and the reference beacons (Si, Si+1) and second communication means (MJ) providing communications between the first mobile object (M) and the second mobile object (Bj), and, on the other hand, communication means (BIJ) providing communications between each refrence beacon (Si, Si+1) and the second mobile object (Bj), which method consists in:
    (a) determining the position of the first mobile object (M) relative to the reference radionavigation system and the orientation of the first direction relative to the first mobile object (M),
    (b) determining the position of the second mobile object (Bj) relative to the reference radionavigation system,
    (c) determining the angular offset between the first and second directions, with a view to correcting the orientation of the first direction relative to the second direction.

2. Method according to claim 1, wherein said first mobile object is a ship towing a marine geophysical prospecting cable and the second mobile object is a buoy at the trailing end of said cable.

3. Method according to claim 1, wherein, said reference radionavigation system being a circular type location radionavigation system, the aforementioned steps (a) and (b) of said method consist in executing the following location protocol:
    using the first communication means (MI) to interrogate each of the reference beacons (Si, Si+1) or a plurality of said reference beacons in order to establish from the round trip propagation time between the mobile (M) and each of the reference beacons (Si, Si+1) interrogated the successive distances (MSi) separating the first mobile (M) from each of the reference beacons (Si, Si+1),
    determining the position of the reference point (R) on the first mobile (M) from the positions of the reference beacons (Si, Si+1),
    using the communication means (BIJ) of the second mobile object (Bj) to receive the signal of frequency (FSi, FSi+1) transmitted in response to interrogation of at least one reference beacon (Si, Si+1) and to retransmit said signal of frequency (FSi, FSi+1) received by said communication means (BIJ) using said second communication means (MJ) to said first mobile (M) in order to determine from the time (Ti) at which each of the reference beacons (Si) is interrogated the length of the closed path ($\overline{MSiBjM}$) formed by the respective elementary distances ($\overline{MSi}$, $\overline{SiBj}$, $\overline{BjM}$) between the first mobile object (M), the reference beacon (Si) and the second mobile object (Bj),
    using said second communication means (MJ) to interrogate said second mobile object (Bj) to determine the distance between the reference point on the first mobile object (M) and the second mobile object (Bj), determining the distances ($\overline{SiBj}$, $\overline{Si+1Bj}$) between the second mobile object (Bj) and at least two reference beacons (Si, Si+1) by calculating the difference between the lengths of the corresponding closed paths ($\overline{MSiBjM}$), ($\overline{MSi+1BjM}$) and the distance ($\overline{MBj}$), determining the position of the second mobile object (Bj) relative to the reference radionavigation system by a circular type location method from the distances ($\overline{SiBj}$, $\overline{Si+1Bj}$) separating said second mobile object from the reference beacons of rank i, i+1.

4. Method according to claim 3, wherein retransmission to said first mobile (M) of the signal at frequency (FSi) received by said communication means (BIJ) by means of said second communication means (MJ) and/or interrogation of the second mobile object (Bj) by means of said second communication means (MJ) are effected at a low power level and at a carrier frequency different to the frequency (FSi, FSi+1) at which the reference beacons (Si), (Si+1) are interrogated.

5. Method according to claim 1, wherein, said reference radionavigation system being a hyperbolic type location radionavigation system, said steps (a) and (b) of said method consist in executing the following location protocol:

using the first communication means (MI) to receive the sequence transmitted by each of the reference beacons (Si), (Si+1) to establish the difference ($\overline{MSi-MSi+1}$) between the distance from the first mobile (M) to a first reference beacon (Si) and the distance from the mobile (M) to a second reference beacon (Si+1) for a plurality N of reference beacons (Si), determining the position of the reference point on the first mobile (M) from the positions of the refrence beacons (Si, Si+1), using the communication means (BIJ) of the second mobile object (Bj) to receive said sequence sent by each of the reference beacons (Si), (Si+1) and using said communication means (BIJ) to retransmit to said first mobile (M) a signal in response to transmission of the frequency (FS) by each reference beacon (Si) to determine the length of the composite path (Si, Bj, M) constituted by each respective elementary distance ($\overline{SiBj}$, BjM), ($\overline{Si+1Bj}$, BjM) between each reference beacon (Si), the second mobile object (Bj) and the first mobile object (M), determining the position of the second mobile object (Bj) relative to the reference radionavigation system by a hyperbolic type location method from the difference ($\overline{SiBj-Si+1Bj}$) between the distances separating said second mobile object (Bj) from the reference beacons (Si), (Si+1).

6. Method according to claim 5, wherein the retransmission by means of said second communication means (BIJ) to the first mobile (M) of a signal in response to transmission by each reference beacon (Si) is effected at a low power level and at a carrier frequency different to the frequencies (FSi) at which the reference beacons (Si) generating the transmit sequence transmit.

7. Method according to claim 6, wherein said retransmission is synchronized to said transmit sequence and is effected between the periods in which each reference beacon (Si) transmits.

8. Method according to claim 1, wherein with a view to enabling location and orientation of a first direction linked to the position and to the orientation of a first mobile object (M) and of a preferred second direction from a plurality of second directions defined by a plurality of second mobile objects (Bj) and at least one reference point on the first mobile object (M), each second mobile object (Bj) is provided with communication means (BIJ) providing communication between each reference beacon (Si, Si+1) and each second mobile object (Bj) and said first mobile object (M) is provided with second communication means (MJ) providing communication between said first mobile object (M) and each second mobile object (Bj).

9. Method according to claim 8, wherein said preferred direction is the mean direction for the set of second objects (Bj) relative to the reference point on the first mobile object.

10. System for locating and orienting a first direction linked to the position and the orientation of an autonomous first mobile object (M) and a second direction defined by a non-autonomous second mobile object (M) and at least one reference point on the first mobile object (M) relative to a fixed reference readionavigation system comprising at least two reference beacons (Si, Si+1), wherein, said radionavigation system being a circular type location radionavigation system, said first mobile object (M) comprises:

first communication means (MI) enabling interrogation of each reference beacon (Si, Si+1) or a plurality thereof, second communication means (MJ) enabling interrogation of said second mobile object (Bj) to determine the distance between the first mobile object (M) and the second mobile object (Bj), said second mobile object (Bj) comprising:

communication means (BIJ) providing communication between each reference beacon (Si, Si+1) and the second mobile object (Bj), said communication means (BIJ) enabling reception of the signal at frequency (FSi) transmitted by each reference beacon (Si, Si+1) and retransmission at the frequency (FBj) to said second communication means (MJ) of the first mobile (M) of a signal in response to the signal (FSi) received by said communication means (BIJ), said system further comprising at the mobile (M):

means for calculating the distances ($\overline{MSi}$), ($\overline{SiBj}$) between the first mobile object (M) and the second mobile object (Bj) and each beacon (Si), (Si+1), means for calculating the position of said first mobile object (M) and said second mobile object (Bj) relative to the reference radionavigation system and the orientation of the second direction relative to the first direction.

11. System according to claim 10, wherein said first communication means (MI) and said second communication means (MJ) of the first mobile (M) are synchronized.

12. System according to claim 10, wherein the second communication means (MJ) of the first mobile (M) used to interrogate said second mobile (Bj) and the communication means (BIJ) enabling retransmission (MJ) from the first mobile (M) of the signal (FSi) in response to interrogation operate at the same carrier frequency (FBj).

13. System according to claim 12, wherein said communication means (BIJ) when used to retransmit to said first mobile (M) the signal in response to the signal transmitted at frequency (FSi) and said second communication means (MJ) of the mobile (M) operate at a low power level and at a carrier frequency (FBj) different to the frequency (FSi) of the signal transmitted by each reference beacon (Si, Si+1).

14. System for locating and orienting a first direction linked to the position and to the orientation of an autonomous first mobile object (M) and a second direction formed by a non-autonomous second mobile object (Bj) and at least one reference point on the first mobile object (M) relative to a fixed radionavigation system comprising at least two reference beacons (Si, Si+1), wherein, said radionavigation system being a hyperbolic type location radionavigation system, said first mobile object (M) comprises:

first communication means (MI) for receiving signals at frequency (FSi, FSi+1) transmitted by each of the reference beacons (Si, Si+1) in a predetermined transmit sequence, said second mobile object (Bj) comprising communication means (BIJ) enabling successively reception of the signals transmitted at frequency (FSi, FSi+1) by each of the reference beacons (Si, Si+1) and retransmission of a signal at frequency (FBj) in response to transmission of the signals of frequency (FSi, FSi+1), said first mobile (M) further comprising:

second communication means (MJ) enabling reception of the signal at frequency (FBj) transmitted by the communication means (BIJ) in response to transmission of the signals at frequency (FSi, FSi+1) by the reference beacons (Si, Si+1), said system further comprising at the first mobile (M):

means for calculating the difference ($\overline{MSi - MSi+1}$) between the distance from the first mobile (M) to a first reference beacon (Si) and the distance from the first mobile (M) to a second reference beacon (Si+1) for a plurality N of refrence beacons (Si), the differences ($\overline{SiBj - Si+1Bj}$) between the second mobile object (Bj) and the reference beacons (Si, Si+1), means for calculating the position of said first mobile object (M) and said second mobile object (Bj) relative to the reference radionavigation system and the orientation of the second direction relative to the first direction.

15. System according to claim 14, wherein said communication means (BIJ) when retransmitting to said first mobiel (M) the signal in response to transmission of the transmit sequence by each reference beacon (Si), (Si+1) operates at a low power level and at a carrier frequency (FBj) different to the frequency (FSi), (FSi+1) at which each of the beacons (Si, Si+1) transmits.

16. System according to claim 14, wherein said communication means (BIJ) of said second mobile object (Bj) enabling reception of the signal transmitted at frequency (FSi) by each reference beacon (Si, Si+1) and retransmission to said second communication means (MJ) of the first mobile object (M) comprises a transponder.

17. System according to claim 10, wherein the first mobile object (M) is a ship towing a marine geophysical prospecting cable and the second mobile object (Bj) is a buoy at the trailing end of a marine geophysical prospecting cable towed by the ship.

18. System according to claim 17, comprising a plurality of second mobile objects each of which is a buoy at the trailing end of a respective one of a plurality of marine geophysical prospecting cables towed by a ship.

* * * * *

UNITED STATES PATENT AND TRADEMARK OFFICE
CERTIFICATE OF CORRECTION

PATENT NO. : 4,855,962
DATED : 8/8/89
INVENTOR(S) : Regnaudin et al.

It is certified that error in the above-identified patent and that said Letters Patent is hereby corrected as shown below:

| | | |
|---|---|---|
| col. 01, line 16 | delete "mobiel" | insert --mobile-- |
| col. 02, line 10 | delete "accep" | insert --accept-- |
| col. 05, line 25 | delete "is" | insert --in-- |
| col. 06, line 54 | delete "e" | insert --be-- |
| col. 09, line 19 | delete "advantageoulys" | insert --advantageously-- |

Signed and Sealed this

Second Day of April, 1991

*Attest:*

HARRY F. MANBECK, JR.

*Attesting Officer*      *Commissioner of Patents and Trademarks*